US007726652B2

(12) United States Patent
Jubinville et al.

(10) Patent No.: US 7,726,652 B2
(45) Date of Patent: Jun. 1, 2010

(54) LOTTERY GAME PLAYED ON A GEOMETRIC FIGURE USING INDICIA WITH VARIABLE POINT VALUES

(75) Inventors: Chantal Jubinville, Hoboken, NJ (US); Stephen G. Penrice, Morristown, NJ (US)

(73) Assignee: Scientific Games International, Inc., Newark, DE (US)

( * ) Notice: Subject to any disclaimer, the term of this patent is extended or adjusted under 35 U.S.C. 154(b) by 253 days.

(21) Appl. No.: 11/258,545

(22) Filed: Oct. 25, 2005

(65) Prior Publication Data

US 2006/0249897 A1 Nov. 9, 2006

Related U.S. Application Data

(60) Provisional application No. 60/622,982, filed on Oct. 28, 2004.

(51) Int. Cl.

| | |
|---|---|
| ***A63F 1/18*** | (2006.01) |
| ***A63F 9/24*** | (2006.01) |
| ***A63F 13/00*** | (2006.01) |
| ***A63F 17/00*** | (2006.01) |
| ***A63F 19/00*** | (2006.01) |

(52) U.S. Cl. ...................... 273/139; 273/138.1; 463/16; 463/17; 463/18; 463/19; 463/20

(58) Field of Classification Search ................. 273/139, 273/138.1; 463/16, 17, 18, 19, 20

See application file for complete search history.

(56) References Cited

U.S. PATENT DOCUMENTS

| | | | |
|---|---|---|---|
| 1,527,929 | A | 2/1925 | Simons |
| 3,089,123 | A | 5/1963 | Hennis et al. |
| 3,245,697 | A | 4/1966 | Nugent |
| 3,699,311 | A | 10/1972 | Dunbar |
| 3,736,368 | A | 5/1973 | Vogelman et al. |
| 3,826,499 | A | 7/1974 | Lenkoff |
| 3,868,057 | A | 2/1975 | Chavez |
| 3,876,865 | A | 4/1975 | Bliss |

(Continued)

FOREIGN PATENT DOCUMENTS

AU 529535 6/1983

(Continued)

OTHER PUBLICATIONS

'Are You In?', (Article).

(Continued)

*Primary Examiner*—Gene Kim
*Assistant Examiner*—Michael D Dennis
(74) *Attorney, Agent, or Firm*—Dority & Manning, P.A.

(57) ABSTRACT

A system, method and lottery ticket that implement a lottery game that uses a geometric figure having a plurality of selection spaces from which a player selects at least one selection space. The selection spaces are then populated with one or more game indicia, with each game indicia having a point value, and prizes are awarded based upon the total number of points associated with the game indicia populated into the player-selected selection spaces. Other lottery games can also be played simultaneously therewith on the same ticket or round of play.

5 Claims, 4 Drawing Sheets

U.S. PATENT DOCUMENTS 3,902,253 A 9/1975 Sabuzawa et al.
3,918,174 A 11/1975 Miller et al.
3,922,529 A 11/1975 Orloff
3,934,120 A 1/1976 Maymarev
4,017,834 A 4/1977 Cuttill et al.
4,095,824 A 6/1978 Bachman
4,105,156 A 8/1978 Dethloff
4,176,406 A 11/1979 Matkan
4,191,376 A 3/1980 Goldman et al.
4,194,296 A 3/1980 Pagnozzi et al.
4,195,772 A 4/1980 Nishimura
4,206,920 A 6/1980 Weatherford et al.
4,241,942 A 12/1980 Bachman
4,243,216 A 1/1981 Mazumber
4,273,362 A 6/1981 Carrier et al.
4,309,452 A 1/1982 Sachs
4,313,087 A 1/1982 Weitzen et al.
4,355,300 A 10/1982 Weber
4,375,666 A 3/1983 Buck et al.
4,398,708 A 8/1983 Goldman et al.
4,407,443 A 10/1983 McCorkle
4,451,759 A 5/1984 Heynisch
4,455,039 A 6/1984 Weitzen et al.
4,457,430 A 7/1984 Darling et al.
4,464,423 A 8/1984 LaBianca et al.
4,466,614 A 8/1984 Bachman et al.
4,488,646 A 12/1984 McCorkle
4,491,319 A 1/1985 Nelson
4,494,197 A 1/1985 Troy et al.
4,536,218 A 8/1985 Ganho
4,544,184 A 10/1985 Freund et al.
4,579,371 A 4/1986 Long et al.
4,591,189 A 5/1986 Holmen et al.
4,634,149 A 1/1987 Donovan
4,665,502 A 5/1987 Kreisner
4,669,729 A 6/1987 Solitt et al.
4,689,742 A 8/1987 Troy et al.
4,726,608 A 2/1988 Walton
4,736,109 A 4/1988 Dvorzsak
4,740,016 A 4/1988 Konecny et al.
4,760,247 A 7/1988 Keane et al.
4,763,927 A 8/1988 Schneider
4,775,155 A 10/1988 Lees
4,792,667 A 12/1988 Chen
4,805,907 A 2/1989 Hagiwara
4,817,951 A 4/1989 Crouch et al.
4,835,624 A 5/1989 Black et al.
4,836,546 A 6/1989 Dire et al.
4,836,553 A 6/1989 Suttle et al.
4,837,728 A 6/1989 Barrie et al.
4,856,787 A 8/1989 Itkis
4,861,041 A 8/1989 Jones et al.
4,870,260 A 9/1989 Niepolomski et al.
4,880,964 A 11/1989 Donahue
4,888,964 A 12/1989 Klinge
4,922,522 A 5/1990 Scanlon
4,943,090 A 7/1990 Fienberg
4,960,611 A 10/1990 Fujisawa et al.
4,961,578 A 10/1990 Chateau
4,964,642 A 10/1990 Kamille
4,996,705 A 2/1991 Entenmann et al.
4,998,010 A 3/1991 Chandler et al.
4,998,199 A 3/1991 Tashiro et al.
5,032,708 A 7/1991 Comerford et al.
5,037,099 A 8/1991 Burtch
5,046,737 A 9/1991 Fienberg
5,074,566 A 12/1991 Desbiens
5,083,815 A 1/1992 Scrymgeour et al.
5,092,598 A 3/1992 Kamille
5,094,458 A 3/1992 Kamille
5,100,139 A 3/1992 Di Bella
5,109,153 A 4/1992 Johnson et al.
5,112,050 A 5/1992 Koza et al.
5,116,049 A * 5/1992 Sludikoff et al. ............ 273/139
5,118,109 A 6/1992 Gumina
5,119,295 A 6/1992 Kapur
5,158,293 A 10/1992 Mullins
5,165,967 A 11/1992 Theno et al.
5,186,463 A 2/1993 Marin et al.
5,189,292 A 2/1993 Batterman et al.
5,193,815 A 3/1993 Pollard
5,193,854 A 3/1993 Borowski, Jr. et al.
5,228,692 A 7/1993 Carrick et al.
5,232,221 A 8/1993 Sludikoff et al.
5,234,798 A 8/1993 Heninger et al.
5,249,801 A 10/1993 Jarvis
5,259,616 A 11/1993 Bergmann
5,273,281 A 12/1993 Lovell
5,276,980 A 1/1994 Carter et al.
5,282,620 A 2/1994 Keesee
5,308,992 A 5/1994 Crane et al.
5,317,135 A 5/1994 Finocchio
5,326,104 A 7/1994 Pease et al.
5,332,219 A 7/1994 Marnell, II et al.
5,342,047 A 8/1994 Hiedel et al.
5,342,049 A 8/1994 Wichinsky et al.
5,344,144 A 9/1994 Canon
5,346,258 A 9/1994 Behn et al.
5,380,007 A 1/1995 Travis et al.
5,393,057 A 2/1995 Marnell, II et al.
5,401,024 A 3/1995 Simunek
5,401,541 A 3/1995 Hodnett
5,403,039 A 4/1995 Borowski, Jr. et al.
5,407,199 A 4/1995 Gumina
5,420,406 A 5/1995 Izawa et al.
5,432,005 A 7/1995 Tanigami et al.
5,451,052 A 9/1995 Behm et al.
5,456,465 A 10/1995 Durham
5,456,602 A 10/1995 Sakuma
5,471,039 A 11/1995 Irwin
5,471,040 A 11/1995 May
5,475,205 A 12/1995 Behm et al.
5,486,005 A 1/1996 Neal
5,513,846 A 5/1996 Niederlien et al.
5,528,154 A 6/1996 Leichner et al.
5,536,016 A 7/1996 Thompson
5,540,442 A 7/1996 Orselli et al.
5,548,110 A 8/1996 Storch et al.
5,550,746 A 8/1996 Jacobs
5,560,610 A 10/1996 Behm et al.
5,564,700 A 10/1996 Celona
5,564,977 A 10/1996 Algie
5,591,956 A 1/1997 Longacre, Jr. et al.
5,599,046 A 2/1997 Behm et al.
5,602,381 A 2/1997 Hoshino et al.
5,621,200 A 4/1997 Irwin et al.
5,628,684 A 5/1997 Bouedec
5,630,753 A 5/1997 Fuchs
5,651,735 A 7/1997 Baba
5,655,961 A 8/1997 Acres et al.
5,667,250 A 9/1997 Behm et al.
5,682,819 A 11/1997 Beatty
5,690,366 A 11/1997 Luciano
5,704,647 A 1/1998 Desbiens
5,722,891 A 3/1998 Inoue
5,726,898 A 3/1998 Jacobs
5,732,948 A 3/1998 Yoseloff
5,741,183 A 4/1998 Acres et al.
5,743,800 A 4/1998 Huard et al.
5,752,882 A 5/1998 Acres et al.
5,756,220 A 5/1998 Hoshino et al.
5,768,142 A 6/1998 Jacobs
5,769,458 A 6/1998 Carides et al.
5,770,533 A 6/1998 Franchi 5,772,509 A 6/1998 Weiss
5,772,510 A 6/1998 Roberts
5,772,511 A 6/1998 Smeltzer
RE35,864 E 7/1998 Weingardt
5,779,840 A 7/1998 Boris
5,789,459 A 8/1998 Inagaki et al.
5,791,990 A 8/1998 Schroeder et al.
5,797,794 A 8/1998 Angell
5,803,504 A 9/1998 Deshiens et al.
5,816,920 A 10/1998 Hanai
5,818,019 A 10/1998 Irwin, Jr. et al.
5,820,459 A 10/1998 Acres et al.
5,823,874 A 10/1998 Adams
5,830,063 A 11/1998 Byrne
5,830,066 A 11/1998 Goden et al.
5,830,067 A 11/1998 Graves et al.
5,833,537 A 11/1998 Barrie
5,835,576 A 11/1998 Katz et al.
5,836,086 A 11/1998 Elder
5,836,817 A 11/1998 Acres et al.
5,848,932 A 12/1998 Adams
5,863,075 A 1/1999 Rich et al.
5,871,398 A 2/1999 Schneier et al.
5,876,284 A 3/1999 Acres et al.
5,882,261 A 3/1999 Adams
5,883,537 A 3/1999 Luoni et al.
5,885,158 A 3/1999 Torango et al.
5,887,906 A 3/1999 Sultan
5,903,340 A 5/1999 Lawady et al.
5,911,418 A 6/1999 Adams
5,915,588 A 6/1999 Stoken et al.
5,934,671 A 8/1999 Harrison
5,970,143 A 10/1999 Shneier et al.
5,979,894 A 11/1999 Alexoff
5,996,997 A 12/1999 Kamille
5,997,044 A 12/1999 Behm et al.
6,003,307 A 12/1999 Naber et al.
6,004,207 A 12/1999 Wilson, Jr. et al.
6,004,208 A 12/1999 Takemoto et al.
6,007,162 A 12/1999 Hinz et al.
6,012,982 A 1/2000 Piechowiak et al.
6,014,032 A 1/2000 Maddix et al.
6,017,032 A 1/2000 Grippo et al.
6,024,641 A 2/2000 Sarno
6,053,405 A 4/2000 Irwin, Jr. et al.
6,077,162 A 6/2000 Weiss
6,080,062 A 6/2000 Olson
6,086,477 A 7/2000 Walker et al.
6,089,978 A 7/2000 Adams
6,099,407 A 8/2000 Parker, Jr. et al.
6,102,400 A 8/2000 Scott et al.
6,107,913 A 8/2000 Gatto et al.
6,119,364 A 9/2000 Elder
6,125,368 A 9/2000 Bridge et al.
6,142,872 A 11/2000 Walker et al.
6,146,272 A 11/2000 Walker et al.
6,149,521 A 11/2000 Sanduski
6,155,491 A 12/2000 Dueker et al.
6,168,521 B1 1/2001 Luciano et al.
6,168,522 B1 1/2001 Walker et al.
6,179,710 B1 1/2001 Sawyer et al.
6,203,430 B1 3/2001 Walker et al.
6,206,373 B1 3/2001 Garrod
6,210,275 B1 4/2001 Olsen
6,217,448 B1 4/2001 Olsen
6,220,596 B1 4/2001 Horan
6,220,961 B1 4/2001 Keane et al.
6,224,055 B1 5/2001 Walker et al.
6,227,969 B1 5/2001 Yoseloff
6,238,288 B1 5/2001 Walker et al.
6,277,025 B1 * 8/2001 Margolin .................... 463/18
6,309,300 B1 10/2001 Glavich
6,312,334 B1 11/2001 Yoseloff
6,315,291 B1 11/2001 Moody
6,330,976 B1 12/2001 Dymetman et al.
6,331,143 B1 12/2001 Yoseloff
6,334,814 B1 1/2002 Adams
6,340,158 B2 1/2002 Pierce et al.
6,368,213 B1 4/2002 McNabola
6,375,568 B1 4/2002 Roffman et al.
6,379,742 B1 4/2002 Behm et al.
6,394,899 B1 5/2002 Walker et al.
6,398,214 B1 6/2002 Moteki et al.
6,398,643 B1 6/2002 Knowles et al.
6,398,644 B1 6/2002 Perrie et al.
6,398,645 B1 6/2002 Yoseloff
6,416,408 B2 7/2002 Tracy et al.
6,419,579 B1 7/2002 Bennett
6,435,408 B1 8/2002 Irwin, Jr. et al.
6,435,500 B2 8/2002 Gumina
6,478,677 B1 11/2002 Moody
6,491,215 B1 12/2002 Irwin, Jr. et al.
6,497,408 B1 12/2002 Walker et al.
6,552,290 B1 4/2003 Lawandy
6,588,747 B1 7/2003 Seelig
6,599,186 B1 7/2003 Walker et al.
6,601,772 B1 8/2003 Rubin et al.
6,637,747 B1 10/2003 Garrod
6,648,735 B2 11/2003 Miyashita et al.
6,648,753 B1 11/2003 Tracy et al.
6,648,755 B1 11/2003 Luciano et al.
6,676,126 B1 1/2004 Walker et al.
6,692,354 B2 2/2004 Tracy et al.
6,702,047 B2 3/2004 Huber
6,773,345 B2 8/2004 Walker et al.
6,776,337 B2 8/2004 Irwin, Jr. et al.
6,786,824 B2 9/2004 Cannon
6,823,874 B2 11/2004 Lexcen
6,875,105 B1 4/2005 Behm et al.
6,929,186 B2 8/2005 Lapstun
7,399,227 B2 * 7/2008 Michaelson et al. ........... 463/18
2001/0027130 A1 10/2001 Namba et al.
2001/0030978 A1 10/2001 Holloway et al.
2001/0034262 A1 10/2001 Banyai
2001/0040345 A1 11/2001 Au-Yeung
2002/0022511 A1 2/2002 Eklund et al.
2002/0084327 A1 7/2002 Ehrhart et al.
2002/0084335 A1 7/2002 Ericson
2002/0171201 A1 11/2002 Au-Yeung
2002/0187825 A1 12/2002 Tracy et al.
2003/0050109 A1 * 3/2003 Caro et al. .................... 463/17
2003/0114210 A1 6/2003 Meyer et al.
2004/0076310 A1 4/2004 Hersch et al.
2004/0119232 A1 * 6/2004 Kerr .......................... 273/269
2004/0173965 A1 9/2004 Stanek
2004/0178582 A1 9/2004 Garrod
2004/0185931 A1 * 9/2004 Lowell et al. ................. 463/17
2004/0204222 A1 10/2004 Roberts
2004/0222586 A1 * 11/2004 Katz et al. ............... 273/138.1
2004/0259631 A1 12/2004 Katz et al.
2004/0266514 A1 12/2004 Penrice

FOREIGN PATENT DOCUMENTS

AU 529536 6/1983
AU B-18428/92 12/1992
AU B-21070/92 7/1993
AU A-50327/96 2/1997
AU B-52499/96 2/1997
AU 199716432 B2 9/1997
AU A-45403/97 4/1998
AU A-63553/98 10/1998
DE 2938307 C2 4/1981
DE 3035898 A1 4/1982
DE 3035947 A1 5/1982
DE 2938307 C3 6/1982

| | | | |
|---|---|---|---|
| DE | 29803107 | U1 | 8/1988 |
| DE | 3822636 | A1 | 1/1990 |
| DE | 2938307 | C3 | 8/1990 |
| DE | 3822636 | A1 | 1/1992 |
| DE | 3415114 | A1 | 10/1995 |
| DE | 19646956 | C1 | 5/1998 |
| DE | 19706286 | A1 | 5/1998 |
| DE | 29816453 | U1 | 4/1999 |
| DE | 19751746 | A1 | 5/1999 |
| EP | 0122902 | B1 | 4/1984 |
| EP | 0333934 | A1 | 9/1989 |
| EP | 0458623 | | 11/1991 |
| EP | 0798676 | A1 | 10/1997 |
| EP | 0799649 | A1 | 10/1997 |
| EP | 0149712 | A2 | 7/1998 |
| EP | 0874337 | A1 | 10/1998 |
| EP | 0896304 | A2 | 2/1999 |
| EP | 0914875 | A2 | 5/1999 |
| EP | 0914875 | A3 | 5/1999 |
| EP | 0919965 | A2 | 6/1999 |
| EP | 0983801 | A2 | 3/2000 |
| EP | 0983801 | A3 | 3/2001 |
| EP | 1149712 | A1 | 10/2001 |
| ES | 2006400 | | 4/1989 |
| ES | 2006401 | | 4/1989 |
| GB | 642892 | A | 9/1950 |
| GB | 2075918 | A | 11/1981 |
| GB | 2222712 | B | 3/1990 |
| GB | 2230373 | A | 10/1990 |
| GB | 2295775 | A | 12/1996 |
| GB | 3328311 | | 2/1999 |
| GB | 23282311 | A | 2/1999 |
| JP | 02235744 | | 9/1990 |
| JP | 04132672 | | 5/1992 |
| WO | WO85/02250 | A1 | 5/1985 |
| WO | WO91/17529 | | 11/1991 |
| WO | WO 98/03910 | | 1/1998 |
| WO | WO 98/40138 | | 9/1998 |
| WO | WO 99/09364 | A1 | 2/1999 |
| WO | WO 99/26204 | | 5/1999 |
| WO | WO 99/39312 | | 8/1999 |
| WO | WO00/00256 | | 1/2000 |
| WO | WO00/78418 | A1 | 12/2000 |
| WO | WO01/74460 | A2 | 11/2001 |
| WO | WO01/93966 | A1 | 12/2001 |
| WO | WO02/056266 | A1 | 7/2002 |

OTHER PUBLICATIONS

'Beginner's Guide-How to Bet', (www.plimico.com/How+to+wager/beginnersguide/), (Internet Article), 3 Pgs.
Chip Brown, 'Austin American-Statesman', (Article), May 28, 1998, 2 Pgs., Texas.
John C. Hallyburton, Jr., 'Frequently Asked Questions About Keno', (Internet Article),1995, 1998, 10 Pgs., (http://conielco.com/faq/keno.html).
'Horse betting Tutorial-Types of Bets' (www.homepokergames.com/horsebettingtutorial.php), (Internet Article), 2 Pgs.
Judith Gaines, 'Pool Party Betting Business Booming Throughout Area Workplaces', (Internet Article), Mar. 19, 1994, 2 Pgs., Issue 07431791, Boston Globe, Boston, MA.
'Maryland Launches Let It Ride', (Internet Article), Circa 2001,1 Pg.
'Notice of Final Rulemaking', (Internet Article) Mar. 24, 2000, 10 Pgs., vol. 6, Issue #13, Arizona Administrative Register, Arizona.
'How to Play Megabucks', (Internet Article), Mar. 9, 2001, 2 Pgs., Oregon Lottery Megabucks,(http://www.oregonlottery.org/mega/m_howto.htm).
'How to Play Megabucks', (Internet Article), May 8, 2001, 2 Pgs., Oregon Lottery Megabucks, (http://www.oregonlottery.org/mega/m_howto.htm).
'Oregon Lottery', (Internet Article), Apr. 30, 2004, 9 Pgs., Oregon Lottery Web Center, (http://www.oregonlottery.org/general/g_hist.shtml).
'Powerball Odd & Prizes', 'How to Play Powerball', (Internet Article), Dec. 2002, 2 Pgs., (www.powerball.com/pbhowtoplay.shtm).
'Powerball Prizes and Odds', (Internet Article), 2 Pgs., http://www.powerball.com/pbprizesNOdds.shtm.
'Learn to Play the Races' (Internet Article), 15 Pgs., Racing Daily Form (www.drf.com).
Mike Parker, 'The History of Horse Racing' (Internet Article),1996, 1997, 1998, 5 Pgs., http://www.mrmike.com/explore/hrhist.htm.

* cited by examiner

| Total number of points | Odds | Prize |
|---|---|---|
| 7 | 1 in 13,282.5 | $1,000 |
| 6 | 1 in 510.9 | $100 |
| 5 | 1 in 76.8 | $10 |
| 4 | 1 in 21.4 | $4 |
| 3 | 1 in 8.0 | $1 |

| | | PRIZE | |
|---|---|---|---|
| Total number of points | Odds | Multiplier for Base Game Prize | Cash |
| 7 | 1 in 13,282.5 | 8 X | $1,000 |
| 6 | 1 in 510.9 | 7 X | $50 |
| 5 | 1 in 76.8 | 6 X | $5 |
| 4 | 1 in 21.4 | 5 X | |
| 3 | 1 in 8.0 | 4 X | |
| 2 | 1 in 4.8 | 3 X | |
| 1 or less | 1 in 1.7 | 2 X | |

LOTTERY GAME PLAYED ON A GEOMETRIC FIGURE USING INDICIA WITH VARIABLE POINT VALUES

CROSS-REFERENCE TO RELATED APPLICATION

This application claims the benefit of U.S. Provisional Application Ser. No. 60/622,982, filed on Oct. 28, 2004, the entirety of which is hereby fully incorporated herein by this reference.

BACKGROUND OF THE INVENTION

1. Field of the Invention

The invention relates generally to a lottery game, and more particularly to a lottery game in which the player selects a plurality of positions within a geometric figure and in which some of the positions in the figure are subsequently populated with indicia.

2. Description of the Related Art

Many governments and/or gaming organizations sponsor wagering games known as lotteries. A typical lottery game entails players selecting permutations or combinations of numbers. This is followed by a "draw," wherein the lottery randomly selects a combination or permutation of numbered balls. Prizes are awarded based on the number of matches between a player's selection and the drawn numbers. The drawn numbers are then well-publicized, and large-jackpot lotteries are popular throughout the world.

Lotteries have become an important source of income to governments as they shoulder much of the financial burden for education and other programs. However, as governments have grown more dependent on and increased the use of lotteries, it has become a challenge to sustain public interest therein and maintain the desired level of game participation. One approach to invigorating lottery sales is to expand game content beyond traditional combination/permutation games in the hope that the new games will help keep current players, as well as draw in new players.

One method to enhance game play is to change game indicia from simple alphanumeric characters to other pictures and images. It is known to use pictures or other game indicia in the lottery game to create a unique prize structure. However, most of the variable game indicia lotteries still rely upon a matching of game indicia and drawn indicia to determine a prize through the correspondent level of matching.

Therefore, it would be advantageous to provide a lottery game that allows winning based upon more than simple number or symbol matching. Further, such lottery game should allow a variable prize structure that is greater than that permitted by pure matching of sets of symbols. It is thus to such an improved lottery game that the present invention is primarily directed.

SUMMARY OF THE INVENTION

The present invention overcomes some of the deficiencies of the lottery games know in the art, and provides new lottery game content in three ways. First, rather than requiring players to select a plurality of indicia from a large set of indicia, the invention allows players to select a plurality of positions from a geometric figure that will subsequently be populated with indicia from a possibly small set of indicia, possibly with repetition. Second, rather than being limited to the use of generic indicia such as numbers, the invention may use symbols, and possibly symbols related to a brand or other popular images with broad consumer appeal. Third, the indicia have point values associated with them so that the value of a player's ticket is determined by the total number of points associated with the indicia in the selected positions, in contrast to awarding prizes based only upon matching symbols.

The invention thus comprises a lottery game in which the player may select a plurality of positions within a geometric figure. Some or all of the positions in the figure are subsequently populated with game indicia having point values. Preferably, the game indicia are related but not limited to an identifiable brand that will appeal to players. The positions may be populated with the indicia either by the lottery system at the time the player's ticket is issued, or they may be populated with indicia as the result of a draw that is held at a predetermined time in which case the assignment of indicia to positions is common for all players. A player's prize is thus a function of the total number of points associated with the indicia in the positions selected by the player.

In one embodiment, the invention is a method for implementing a lottery game using a geometric figure having a plurality of selection spaces comprising the steps of allowing a player to select at least one selection space within the geometric figure, populating one more of the selection spaces with one or more game indicia, wherein each game indicia has a point value, and then awarding a prize based upon the total number of points associated with the game indicia in the player-selected selection spaces.

In one embodiment, the invention is a system for implementing a lottery game comprising at least one game server that implements the lottery game using a geometric figure having a plurality of selection spaces, and at least one dispensing terminal that allows a player to select at least one selection space within the geometric figure of the lottery game implemented by the game server. The game server further populates one more of the selection spaces with one or more game indicia, with each game indicia having a point value, and the game server further awards a prize to the player based upon the total number of points associated with the game indicia in the player-selected selection spaces.

The invention also includes a lottery game ticket including a geometric figure having a plurality of selection spaces that allows a player to select at least one selection space within the geometric figure, and allows one more of the selection spaces to be populated with one or more game indicia, with each game indicia having a point value. The lottery ticket allows a determination of a prize is based upon the total number of points associated with the game indicia in the player-selected selection spaces.

Other objects, features, and advantages of the present invention will become apparent after review of the hereinafter set forth Brief Description of the Drawings, the Detailed Description of the Invention, and the Claims.

DETAILED DESCRIPTION OF THE INVENTION

Figure 1:
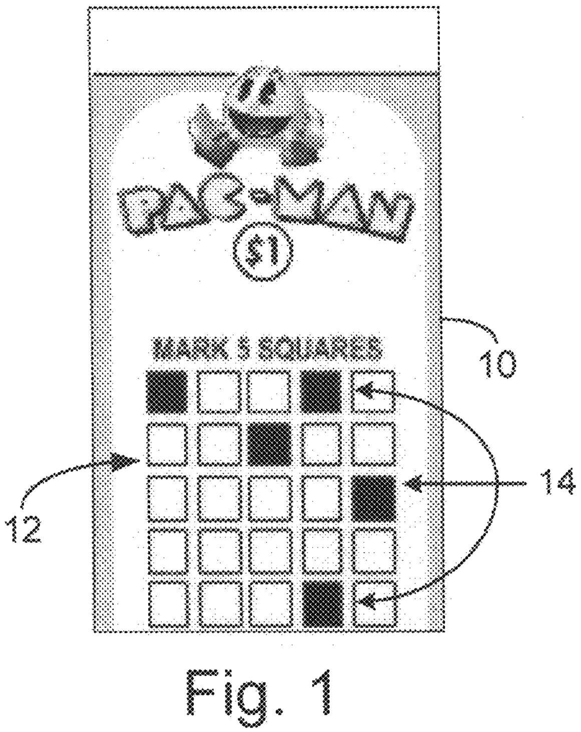
FIG. 1 is an illustration of one embodiment of a lottery game bet slip of the present invention using a geometric figure.

Referring now to the drawings, in a first embodiment of the inventive lottery game shown in FIG. 1, the player initiates a play of the game using a bet slip 10 that displays a geometric figure that comprises a plurality of cells 12. The player marks a subset 14 of these cells to indicate his selection for the game and then submits the bet slip 10 along with an amount of money to an authorized lottery retailer, as known in the art, who will enter the information into a terminal (such as game terminal 54 in FIG. 7) connected to the lottery's central system. Alternatively, the lottery may offer self-serve kiosks where the player may indicate his selections, either with a bet slip 10 or touch-screen technology if provided by the kiosk, and submit the money though a bill collector on the machine, as is known in the art.

After the lottery system accepts the wager, it prints a ticket 20 (FIG. 2) indicating the player's selection. In one embodiment of the invention, the lottery may also print indicia on the ticket. Each indicium has a point value associated therewith. The player adds the points associated with the indicia that appear in the selected cells and compares the point total to a prize table that indicates what prize, if any, corresponds to that point value. If the point value on the ticket does correspond to a prize, the player submits the ticket to a retailer or to a self-service kiosk for ticket validation and prize payment.

In an alternate embodiment, the ticket displays the player's selection but does not indicate the placement of the indicia in the geometric figure. In this embodiment, a drawing is held after sales are discontinued, the drawing comprising a selection of cells, without replacement, for each indicium in the set of indicia. The point value of the player's ticket can then be determined and the ticket validated as described above.

Figure 2:
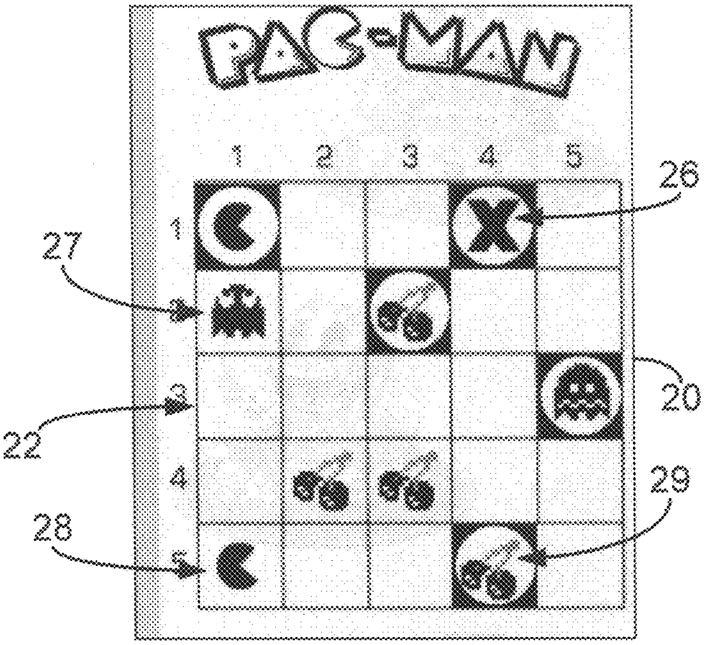
FIG. 2 is an illustration of one embodiment of a ticket for the lottery game entered by the bet slip of FIG. 1.

A sample embodiment of this invention is described as follows. The player chooses five positions from a 5×5 square grid 12 using a bet slip 10 as shown in FIGS. 1 and 2. The indicia for this embodiment comprise images from the arcade game Pac-Man®. Specifically they are two instances 28 of Pac-Man®, worth two points each, four instances of a pair of cherries 29, worth one point each, and two instances of ghosts 27, worth negative one (−1) point each. Note that this implies that the populated grid 22 will have seventeen blank spaces, which have no point value. In this embodiment, the assignment of indicia to positions on the grid occurs immediately.

Figures 5, 6:
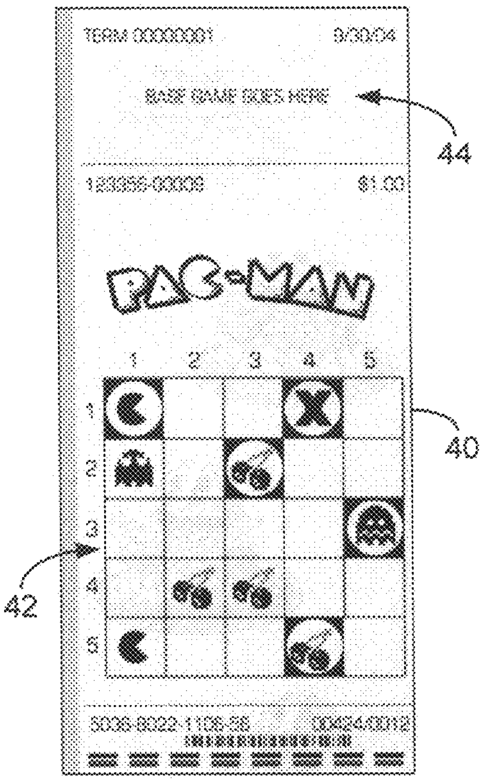
FIG. 5 is an illustration of another embodiment of a ticket for the lottery game entered by the bet slip of FIG. 4.
FIG. 6 depicts a second exemplary prize table for the lottery game.

Using a random number generator, as known in the art, the lottery system assigns the indicia to a 5×5 grid. The system then issues a ticket that displays the grid, the indicia and the player's selected positions. As shown in FIGS. 2 and 5, an "X" is used to indicate a position selected by the player that was not assigned an indicium. FIG. 2 shows as a sample ticket for this embodiment in which the player's selected cells contain one Pac-Man® 28, two pairs of cherries 29 and one ghost 27, with one missed space 26. The player's ticket 20 has therefore earned a total of three points.

Figures 3, 4:
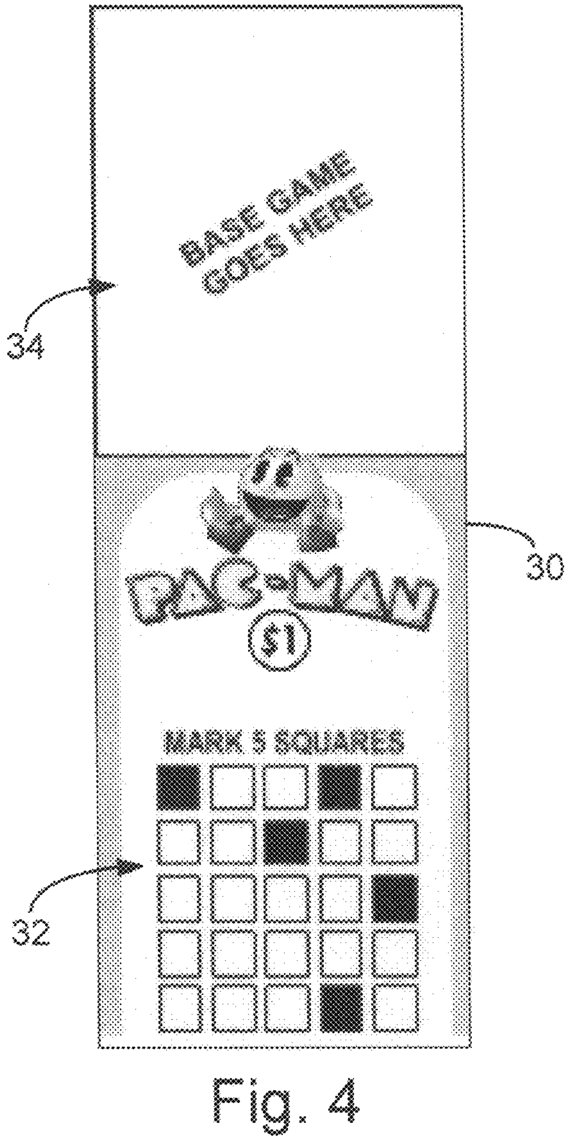
FIG. 3 depicts an exemplary prize table for the lottery game.
FIG. 4 is an illustration of another embodiment of a lottery game bet slip of the present invention.

FIG. 3 shows a prize table for this embodiment of the lottery game. After the players determine the point value of their ticket, they may use the prize table to determine if they have won a prize and, if so, the magnitude of the prize. In this example, the player has won $1.

In assigning indicia to positions on the geometric figure/grid, the lottery system may randomly select and populate the positions (typically via a randomized algorithm or a drawing) or it may use the method of reverse mapping, i.e. it may randomly determine the number of points that the player will earn first and then assign the indicia to the positions so as to effect a ticket that has the selected point value. Other methods as known in the art to automatically populate the indicia in a "quick pick" manner can be used herein. The odds shown in the table in FIG. 3 assume the former method. Moreover, in an alternate embodiment where the indicia are assigned to the positions by means of a draw, these odds must be calculated so that the lottery can determined its expected prize liability and players can understand their chances of winning.

The following example shows how the odds may be computed in the case where indicia are randomly assigned to positions. Consider the event where a ticket earns exactly six points. This can happen in one of two ways: a) the player's selected positions contain two Pac-Man® symbols 28, two pairs of cherries 29, zero ghosts 27 and one blank space or b) the player's selected positions contain one Pac-Man® symbol 28, four pairs of cherries 29, zero ghosts 27 and zero blank spaces. Under the assumption that the indicia are placed on the geometric figure randomly, the probability of each case can be computed as follows:

$$a)\ \frac{\binom{2}{2}\binom{4}{2}\binom{2}{0}\binom{17}{1}}{\binom{25}{5}} \approx 0.00192$$

$$b)\ \frac{\binom{2}{1}\binom{4}{4}\binom{2}{0}\binom{17}{0}}{\binom{25}{5}} \approx 0.000038$$

Thus the total probability of earning six points is 0.001957, or approximately 1 in 510.9.

Note that in general, if k objects are selected from a set S of cardinality n that is partitioned into subsets $S_1, S_2, \ldots, S_m$ with cardinalities $n_1, n_2, \ldots, n_m$, respectively, then for nonnegative integers $k_1, k_2, \ldots, k_m$ with $k_1+k_2 \ldots +k_m=k$, the probability that exactly $k_i$ of the objects are from $S_1$ for $i=1, \ldots,$ $$m \text{ is } \frac{\binom{n_1}{k_1}\binom{n_2}{k_2}\cdots\binom{n_m}{k_m}}{\binom{n}{k}}$$

where $$\binom{i}{j}$$

denotes a binomial coefficient and by convention $$\binom{i}{j} = 0 \text{ if } i < j.$$

The computation of these odds is facilitated by a method of automatically generating a list of all possible ways of expressing a positive integer n as an ordered sum of k nonnegative integers. For example, in the calculations above one may make use of a list of all the possible ways of writing 5 as a sum of four nonnegative integers, where order matters, i.e. 0+2+2+1 is distinct from 2+1+0+2. It is well known within combinatorial mathematics that these can be put in one-to-one correspondence with (k−1)-element subsets of a (n+k−1)-element set; see for example pp. 14-15 of Stanley's *Enumerative Combinatorics, Vol.* 1. Methods for generating all such subsets are also well-known; see pp. 43-52 of Kreher and Stinson's *Combinatorial Mathematics: Generation, Enumeration, and Search.*

The foregoing sample embodiment is for a stand-alone lottery game. The invention may also be embodied as an "extension game." Specifically, the game may be offered for sale only in combination with another lottery game, referred to here as the "base game." When embodied as an extension game, the prize table may include multiplier values as prizes. When a player wins a multiplier prize, say, for example 3×, one or more prizes that he wins in the base game may be multiplied by the multiplier value.

When embodied as an extension game, the prize table may include multiplier values as prizes. When a player wins a multiplier prize, say, for example 3×, one or more prizes that he wins in the base game may be multiplied by the multiplier value. The present invention may be embodied as an extension game, that is, a lottery game that can only be played in conjunction with another lottery game, referred to as the "base game." In such an embodiment the prizes available to the player may include a multiplier value that multiplies one or more prizes that the player may have won in the base game. Extension games with multipliers as prizes are known in the art.

As shown in the following example. FIG. 4 shows a bet slip 30 for an embodiment of the present invention as an extension game. The upper part 34 of the bet slip 30, which is not shown in detail, is filled out by the player as are the known lottery bet slips common within the art. The lower part 32 of the bet slip 30, however, is filled out in the same manner as the bet slip 10 shown in FIG. 1. The player submits the bet slip 30 along with an amount of money to cover wagers in both the base game and the extension game, using the methods described in the previous example. The lottery system accepts the wager and issues a ticket 40. FIG. 5 shows a ticket 40 for this embodiment, in the case where the lottery's placement of indicia in the geometric FIG. 42 occurs at the time of purchase. Those skilled in the art will recognize that the invention may also be embodied as an extension game where the indicia are assigned positions in the figure during a draw. FIG. 6 shows a prize table for this embodiment. In this example, the player has won a 4× multiplier. Thus, one or more prizes that are available in the base game will be multiplied by four if the player should win such a prize in the play of the base game that is documented on the upper portion of the ticket.

Figure 7:
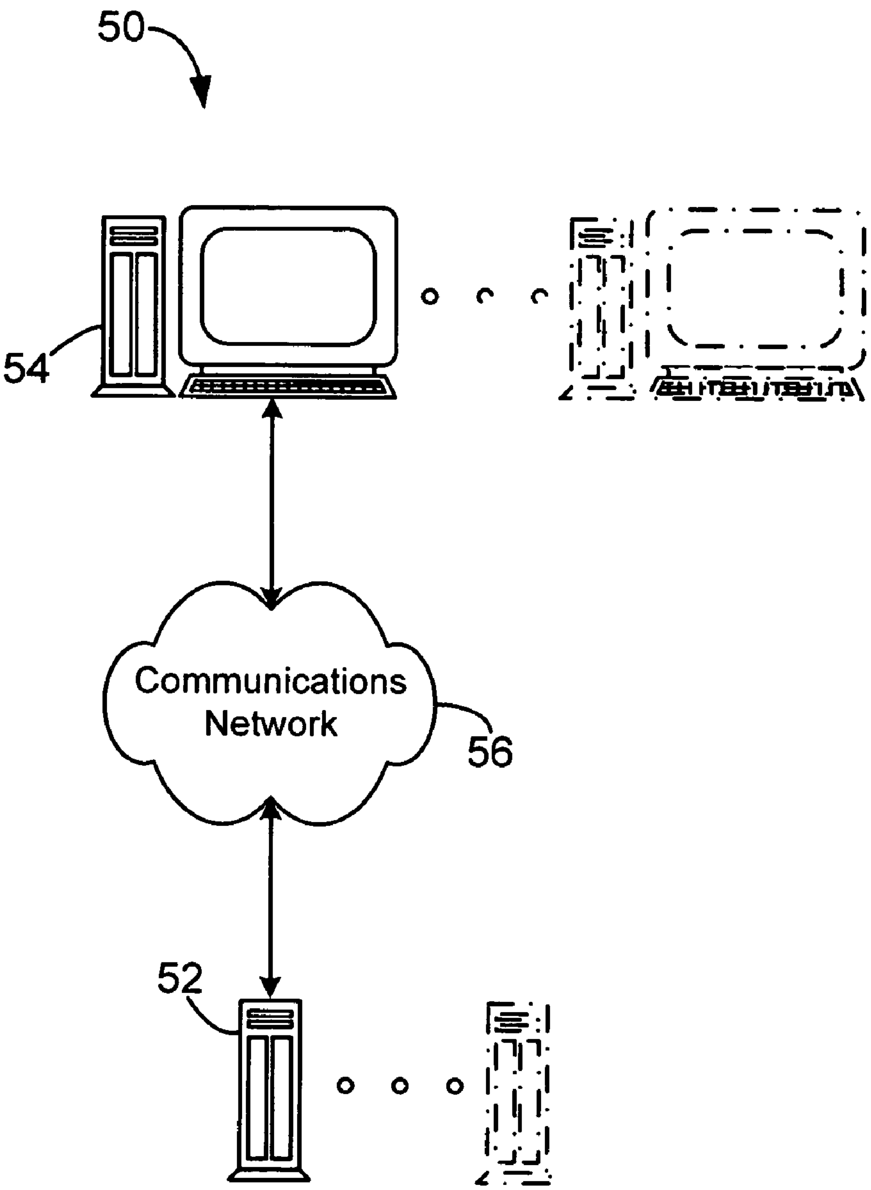
FIG. 7 is a diagram of one embodiment of a game server in communication with a game terminal issuing tickets for the inventive lottery game.

FIG. 7 is a diagram of one embodiment of a game server 52 in communication with a game terminal 54 across a network 56 issuing tickets for the inventive lottery game. The system 50 for implementing a lottery game includes at least one game server 52 that implements a lottery game using a geometric FIG. 12 having a plurality of selection spaces. At least one dispensing terminal 52 that allows a player to select at least one selection space within the geometric FIG. 12 of the lottery game implemented by the game server 52. The game server 52 populates one more of the selection spaces with one or more game indicia (27,28,29), wherein each game indicia having a point value, and the game server 52 further awards a prize to the player based upon the total number of points associated with the game indicia in the selected selection spaces.

The game terminal 54 can further providing a player a ticket having a printed matrix of selection spaces, such as bet slip 10 such that the player can select one or more selection spaces on the printed matrix of selection spaces. The game terminal 54 can also further print a ticket 20 showing the selection spaces populated with game indicia. The game server 52 can populate one or more of the selection spaces with one or more game indicia with issuance of the ticket 20, or can populates one or more of the selection spaces with one or more game indicia as the result of a draw or other random picking that is held at a predetermined time. Further, the game server can implements a second lottery game played simultaneously with the steps for implementing the lottery game using a geometric figure, such as shown in FIGS. 4 and 5.

The foregoing descriptions present only exemplary embodiments of the invention. Those of ordinary skill in the art will readily recognize that the invention may be embodied in a variety of ways by varying the geometric figures, the plurality of positions within the figure, the plurality of positions selected by the player, the symbols, the plurality of symbols, the plurality of instances of each symbol, the assignment of point values to the symbols, and the prize table. In particular it is contemplated there may be a lottery game where all the indicia are identical or have equal point values. These, and other variations of the game, are contemplated as being within the scope of the present invention.

What is claimed is:

1. A system for implementing a lottery game, comprising:

at least one game server that implements a lottery ticket based game using a plurality of selection spaces provided in a matrix on a lottery ticket, the selection spaces being indistinguishable from each other except for their relative position within the matrix format;

at least one dispensing terminal that accepts a player's designation of a subset of the selections spaces in the matrix based solely on their respective relative position in the matrix, the designated subset of selection spaces being less than all of the selection spaces within the matrix of selection spaces implemented by the game server, the player's designation of the subset of selection spaces being done prior to the game server randomly assigning game indicia to selection spaces;

wherein the game server is configured to subsequently randomly populate a plurality of the selection spaces within the same matrix format that is less than all of the selection spaces but greater than the number of selection spaces in the player's subset of selection spaces with one or more game indicia utilizing a random drawing or random generation algorithm such that the randomly populated selection spaces are not determined as a function of the player's designated subset of selection spaces and the player's odds of winning the lottery game are predetermined and known prior to start of the lottery game by the player, and to indicate on a lottery ticket issued by the dispensing terminal the entire matrix with the player's designated subset of selection spaces and the randomly populated selection spaces with game indicia visually displayed in the matrix;

said game server further configured to randomly vary a point value of the game indicia between negative and positive values populated into the plurality of selection spaces; and wherein the game server is further configured to indicate on the lottery ticket a prize to the player based upon the total number of points associated with the game indicia randomly populated into the player's designated selection spaces.

2. The system of claim 1, wherein the game terminal is configured to accept a play slip from the player having the players subset of selected selection spaces designated in the printed matrix of selection spaces.

3. The system of claim 1, wherein the game server populates the plurality of the selection spaces with one or more game indicia with issuance of the ticket.

4. The system of claim 1, wherein the game server randomly populates the plurality of the selection spaces with one or more game indicia as the result of a subsequent drawing wherein the randomly populated selection spaces apply to a plurality of player lottery tickets.

5. The system of claim 1, wherein the game server further implements a second lottery game played simultaneously with implementing a lottery game using a geometric figure.

* * * * *